(12) United States Patent
Johnson

(10) Patent No.: US 10,212,226 B2
(45) Date of Patent: Feb. 19, 2019

(54) NODE CLUSTER SYNCHRONIZATION

(71) Applicant: Hewlett Packard Enterprise Development LP, Houston, TX (US)

(72) Inventor: Charles Stuart Johnson, San Jose, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 210 days.

(21) Appl. No.: 15/106,447

(22) PCT Filed: Jan. 16, 2014

(86) PCT No.: PCT/US2014/011867
§ 371 (c)(1),
(2) Date: Jun. 20, 2016

(87) PCT Pub. No.: WO2015/108520
PCT Pub. Date: Jul. 23, 2015

(65) Prior Publication Data
US 2017/0006097 A1 Jan. 5, 2017

(51) Int. Cl.
*H04J 3/06* (2006.01)
*H04L 29/08* (2006.01)
*G06F 11/16* (2006.01)
*H04L 7/00* (2006.01)
*H04L 7/04* (2006.01)
*H04L 29/06* (2006.01)
*G06F 11/14* (2006.01)

(52) U.S. Cl.
CPC ...... *H04L 67/1095* (2013.01); *G06F 11/1691* (2013.01); *H04L 7/0016* (2013.01); *H04L 7/042* (2013.01); *H04L 65/4076* (2013.01); *G06F 11/1482* (2013.01)

(58) Field of Classification Search
CPC ............ H04L 67/1095; H04L 65/4076; H04L 7/0016; H04L 7/042; G06F 11/1691; G06F 11/1482
USPC ........................................................ 370/508
See application file for complete search history.

(56) References Cited

U.S. PATENT DOCUMENTS

| 5,566,180 A | 10/1996 | Eidson et al. |
| 6,247,059 B1 | 6/2001 | Johnson |
| 6,785,696 B2 | 8/2004 | Mosher, Jr. |

(Continued)

OTHER PUBLICATIONS

PCT Search Report/Written Opinion—Application No: PCT/US2014/011867 dated Oct. 10, 2014—11 pages.

(Continued)

*Primary Examiner* — Mang Hang Yeung
(74) *Attorney, Agent, or Firm* — Hewlett Packard Enterprise Patent Department

(57) ABSTRACT

Systems and methods associated with computing cluster synchronization are disclosed. One example method includes periodically requesting timing values from a set of notes in a computing cluster. The method also includes receiving timing values from members of the set of nodes. The method also includes providing a synchronization value to members of the set of nodes. The synchronization value may be generated based on the timing values. Additionally, the synchronization value may be used to order events across the members.

14 Claims, 8 Drawing Sheets

(56) References Cited

U.S. PATENT DOCUMENTS

| | | |
|---|---|---|
| 7,565,419 B1* | 7/2009 | Kwiatkowski ........ H04L 67/104 709/203 |
| 2002/0091846 A1 | 7/2002 | Garcia-Luna-Aceves et al. |
| 2005/0089131 A1 | 4/2005 | Howell et al. |
| 2005/0138484 A1 | 6/2005 | Moyer et al. |
| 2007/0025481 A1* | 2/2007 | Ryu ..................... H04J 3/0667 375/354 |
| 2007/0104203 A1 | 5/2007 | Sood et al. |
| 2009/0158075 A1 | 6/2009 | Biberstein et al. |
| 2011/0249688 A1 | 10/2011 | Liu |
| 2011/0255528 A1* | 10/2011 | Zakrzewski ........ H04W 56/009 370/350 |
| 2012/0207183 A1 | 8/2012 | Bobrek et al. |
| 2012/0243438 A1 | 9/2012 | Steiner et al. |
| 2012/0320794 A1 | 12/2012 | Belhadj et al. |
| 2015/0092754 A1* | 4/2015 | Gupta .................... H04W 4/04 370/336 |

OTHER PUBLICATIONS

The Trouble with Timestamps, (Web Page), http://aphyr.com/posts, Retrieved Jun. 20, 2016, 6 Pages.

\* cited by examiner

NODE CLUSTER SYNCHRONIZATION

BACKGROUND

In distributed service (e.g., a distributed database), when an event (e.g., a database query) causes a change in the service depending on a state of the service, it can matter whether the event occurred before or after the state is modified by another event. During normal operations, a variety of tactics for handling these types of race conditions may be employed. However, when there has been a disruption in the distributed service (e.g., a node failure), it can be difficult to ensure that the state of the service when restored is the same as or at least consistent with that service state before the disruption. One way to recover the original state may involve rolling back nodes in the distributed service to a point prior to the disruption and rapidly re-performing events, and possibly undoing incomplete events. To ensure consistency in the state of the distributed system before and after the recovery, the ordering of the events may be determined so that the events can be re-performed in substantially the same order as they originally occurred, or in an order consistent with an originally intended ordering that was partially completed.

For this type of ordering, conventional clocks are often considered unreliable because conventional clocks will diverge across none boundaries, despite occasional synchronization. Instead, some conventional systems use Lamport clocks, which increase their clock values stepwise as events occur on individual nodes. As nodes interact, Lamport clock values may be passed with signals between the nodes. Upon receiving a signal, a node may increase its Lamport clock to a received Lamport clock value when the received value is higher than the local node's Lamport clock value. During a system recovery, events may be replayed in an order determined by their shared Lamport clock values. However, these systems may have high network overhead because Lamport clock values are rapidly passed with signals between nodes as events occur. Other conventional systems may require that each event causing a state change be recorded in one more centralized nodes. These systems may have high network overhead due to every event being reported to the centralized nodes.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Systems and methods associated with node cluster synchronization are described. In various examples, node cluster synchronization may be achieved by a process on a node in a cluster of nodes that periodically requests Lamport clock values from the nodes in the cluster. After receiving the Lamport clock values, the process may send a synchronization value to the nodes that the nodes can use to create a loose ordering of events occurring on the nodes in the event of a system recovery.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
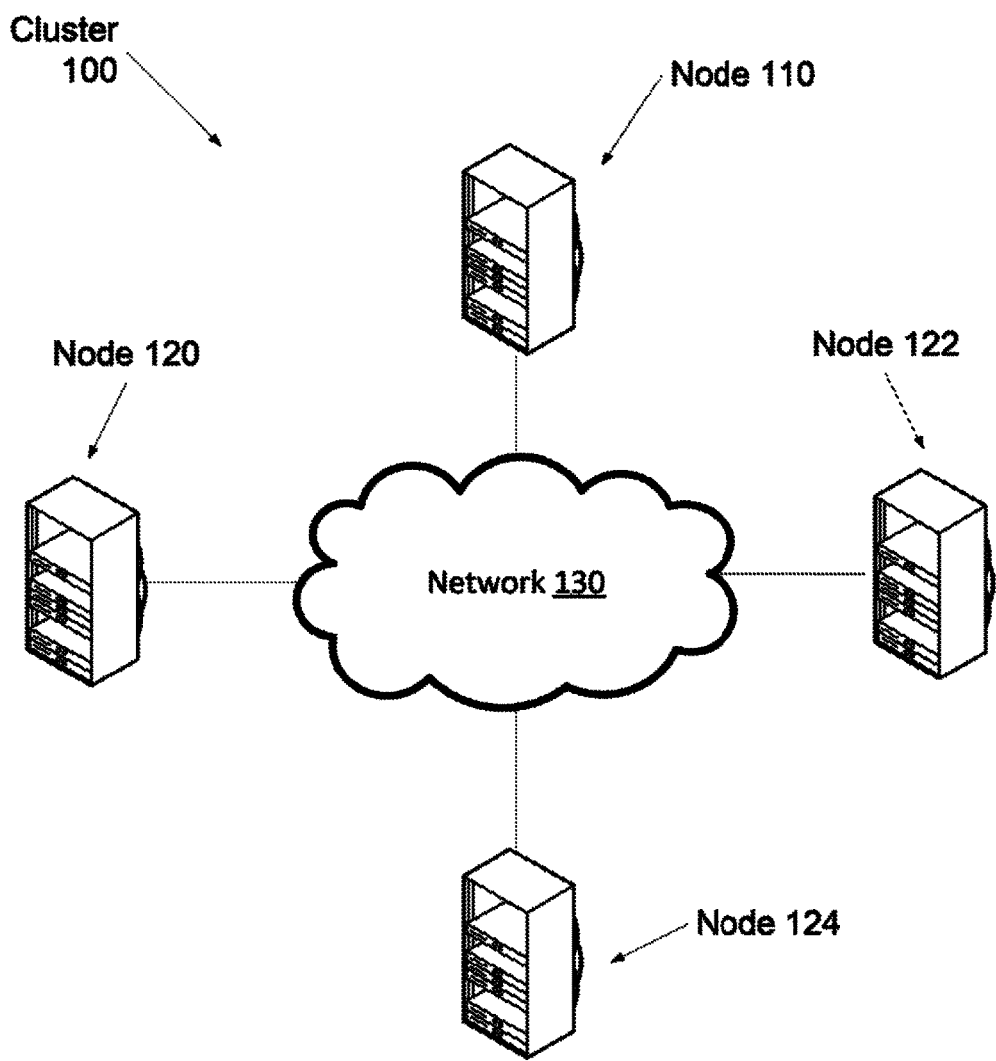
FIG. 1 illustrates example computing cluster in which example systems and methods, and equivalents, may operate.

FIG. 1 illustrates an example computing cluster 100 in which example systems and methods, and equivalents may operate. The computing cluster 100 includes a node 110 that may include a synchronization logic. The node may be connected via a network 130 (e.g., the Internet) to other nodes 120, 122, and 124. In various examples the nodes may all be running similar processes. For example, computing cluster 100 may operate a distributed service such as a distributed database system. In this example, each node may serve a portion or a mirror of the service. In another example, different nodes may serve different purposes, each running their own applications and/or sub-services.

For whatever purpose computing cluster 100 is configured, increasing the uptime of the nodes may improve the availability of the distributed service. In the event of a service disruption due to, for example, a hardware failure on a node (e.g., node 120), quickly restoring functionality of the node (or to an equivalent node) may increase the availability of the distributed service. Restoring functionality of the node may include restoring the node to a state that the node had prior to the node failure, or to a state that is consistent with that prior state. By way of illustration, if computing cluster 100 operates as a distributed database, restoring the node to the state the node had prior to the node failure (or to a state contestant with the state the node had prior to the node failure) may involve simply restoring the distributed database to a state the database had prior to the failure, or a state consistent with the prior database state. Database restoration may involve loading a backup of the database, and then replaying events that occurred in the database between the time of the backup and the failure. In some examples, database restoration may also include undoing incomplete operations.

One potential delay to restoration of the distributed service may involve ensuring that events are replayed in effectively the same order as the events occurred prior to the service disruption, or an order consistent with the intended result. Specifically, an effort should be made to ensure that events that depend on prior events are replayed in their original order because replaying interdependent events out of order may result in a restored service with a different state, or a state inconsistent with a state from before a failure. Some events that do not depend on prior events may be able to be replayed in partial order, as opposed to total order, without causing the restored overall state to differ from or be inconsistent with the original state. Typically, ensuring events are replayed in an order to restore the distributed service to a same state or a consistent state involves identifying an ordering of the events as they originally occurred. To facilitate ordering the events, nodes 110, 120, 122, and 124 may tag events with local Lamport clock values as the events occur. When the events need to be replayed to restore access to the distributed service, the Lamport clock values may be taken into account to ensure that the events are replayed in an over substantially similar to the local order in which the events originally occurred.

However, merely tagging events with local Lamport clock values may not be sufficient to order events in a distributed system without some form of synchronization between the nodes. For example, if 1000 events occur on node 120 in an epoch, and 10 events occur on node 122 within the same epoch, it may be difficult to determine when the 10 events from node 122 occurred within the 1000 events from node 120. To reconcile the total ordering of the distributed system from the multiple partial node orderings, a function may be used that compares the ordering of a pair of events and returns a result that one event occurred before the other, or that it is uncertain which event occurred first. Though complex ordering functions with high accuracy may be used to determine the ordering of events, and arbitrary tiebreaking may be employed when an ordering is still indeterminable, limiting the number of events that use the complex functions and/or tiebreaking methods may reduce the time it takes to order events and increase ordering accuracy. Furthermore, a total ordering of all events may not be possible when a large number of events are considered and a small time is allotted for service recovery. Thus, a fast function that can categorize the majority of event pairs may reduce the number of event pairs for which more complex functions are used to a point where the small number of pairings using the complex functions does not substantially affect the restoration time of the distributed service. Consequently, the fast categorization function may facilitate restoration of systems that previously could not be restored.

To that end, she synchronization logic on node 110 may send a periodic signal requesting Lamport clock values from the nodes (e.g., 110, 120, 122, and 124) in computing cluster 100. Upon receiving Lamport clock values from the nodes, the synchronization logic may provide a synchronization signal to the nodes. The synchronization signal may, for example, cause the nodes to modify their Lamport clock values. Alternatively, the synchronization signal may cause the nodes to increment a global sequence number that the nodes can use to determine which epoch a Lamport clock value is associated with. The global sequence numbers may then be used when reordering events on the nodes to quickly determine for many event pairs whether one occurred before the other. Though some nodes may briefly operate in different epochs, the synchronization logic may ensure that all nodes are operating in the same epoch before triggering movement to a subsequent epoch. This may ensure that unless two events occurred during the same epoch or during adjacent epochs, the nodes may be able to definitively determine that one event preceded the other when creating an ordering of events during a recovery.

Thus, by periodically requesting Lamport clock values from the nodes and sending a synchronization signal to the nodes, the synchronization logic may be able to limit the number of events that a given event must be compared to using complex ordering functions and/or tiebreaking functions when ordering events to replay. Further, because a single node is coordinating the synchronization, network overhead may be reduced because signals passed between individual nodes may forgo including Lamport clock information. Additionally, nodes are less likely to become desynchronized from the system due to isolation, because periodic broadcasts from the synchronization logic may ensure that nodes periodically check in with their Lamport clock values, and are periodically synchronized with other nodes.

Figure 2:
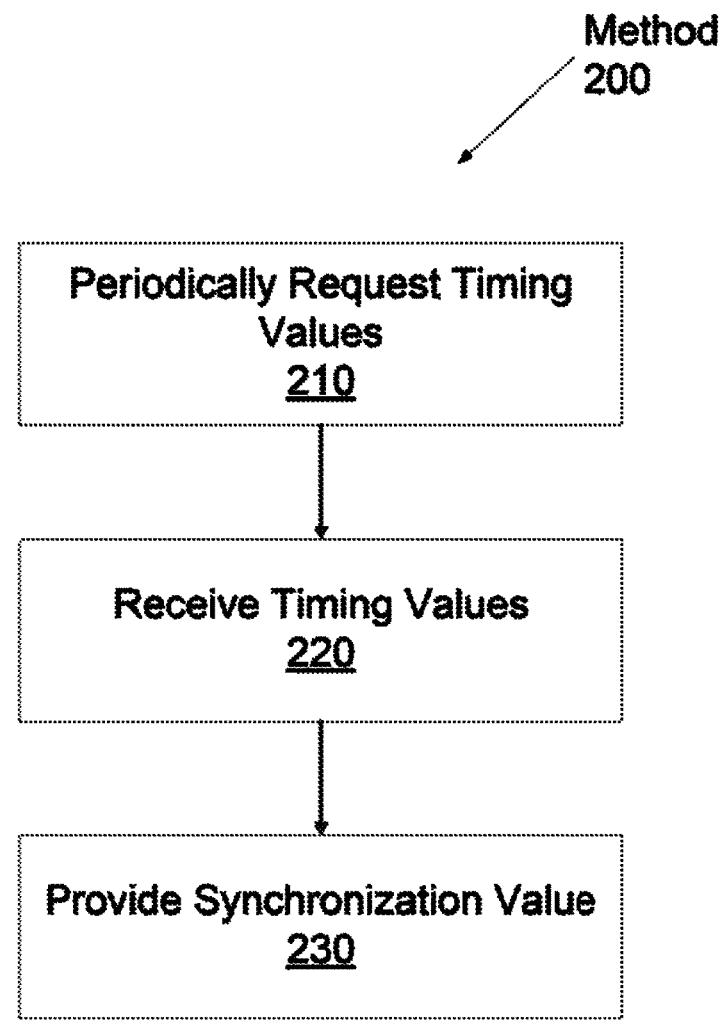
FIG. 2 illustrates a flowchart of example operations associated with node cluster synchronization.

FIG. 2 illustrates a method 200 associated with node cluster synchronization. Method 200 includes periodically requesting timing values from a set of nodes in a computing cluster at 210. The requesting at 210 may be performed, for example, by a synchronization logic operating on one of the nodes in the computing cluster. Thus, requesting the timing values at 210 may involve transmitting a request over a network to other nodes in the computing system. In one example, the synchronization logic may request a timing value from a node on which the synchronization logic resides by reading the timing value from the local memory of that node. The timing values may be, for example, Lamport Clock values. Other methods of timing (e.g., vector clocks, other logical clocks, conventional clocks) may also serve as timing values.

Method 200 also includes receiving timing values from members of the set of nodes at 220. The timing values may be received by, for example, the synchronization logic. Method 200 also includes providing a synchronization value to members of the set of nodes at 230. The synchronization value may be provided at 230 by the synchronization logic upon receiving the timing values at 220 from each of the nodes in the computing cluster. Thus, the synchronization value may be generated based on the timing values. By way of illustration, the synchronization value may be generated based on the greatest timing value when, for example, the timing values are Lamport clock values. Alternatively the synchronization value may be generated based on having received timing values from the nodes in the computing cluster. In this example, the node on which the synchronization logic resides may record these numbers and then send remote nodes a signal causing a global sequence number to be implemented. A combination may also be employed.

Waiting until the response has been received from each of the nodes may ensure that the synchronization value provided at 230 accurately reflects the current state of Lamport clock values on the nodes. For example, if the synchronization value sent to the nodes is to be based on the largest Lamport clock value received from the nodes, providing the synchronization value before receiving Lamport clock values from each of the nodes may result in an inaccurate synchronization value being sent to the nodes. Alternatively, failure to receive a synchronization value from a node may indicate the node has failed and a recovery action should be initiated.

The synchronization value may be used to order events across the members of the set of nodes. In one example, the event ordering may occur when performing a recovery of a state of the computing cluster. Events may be ordered by comparing Lamport clock values and synchronization values with which the events are associated. Assuming that the synchronization values are used to designate divisions between a series of sequential epochs during which events occur on the various nodes in the computing cluster, it may be possible to determine with certainty that a first event occurred before a second event when an epoch during which the first event occurred precedes an epoch during which the second event occurred by at least one additional epoch. Put another way, where the synchronization value is a global sequence number, when the global sequence number of a second action is greater than the global sequence number of a first action plus one, the first action must have preceded the second action. This relationship may limit the number of pairs of events for which complex ordering and/or tiebreaking processes will be used to determine event ordering.

Figure 3:
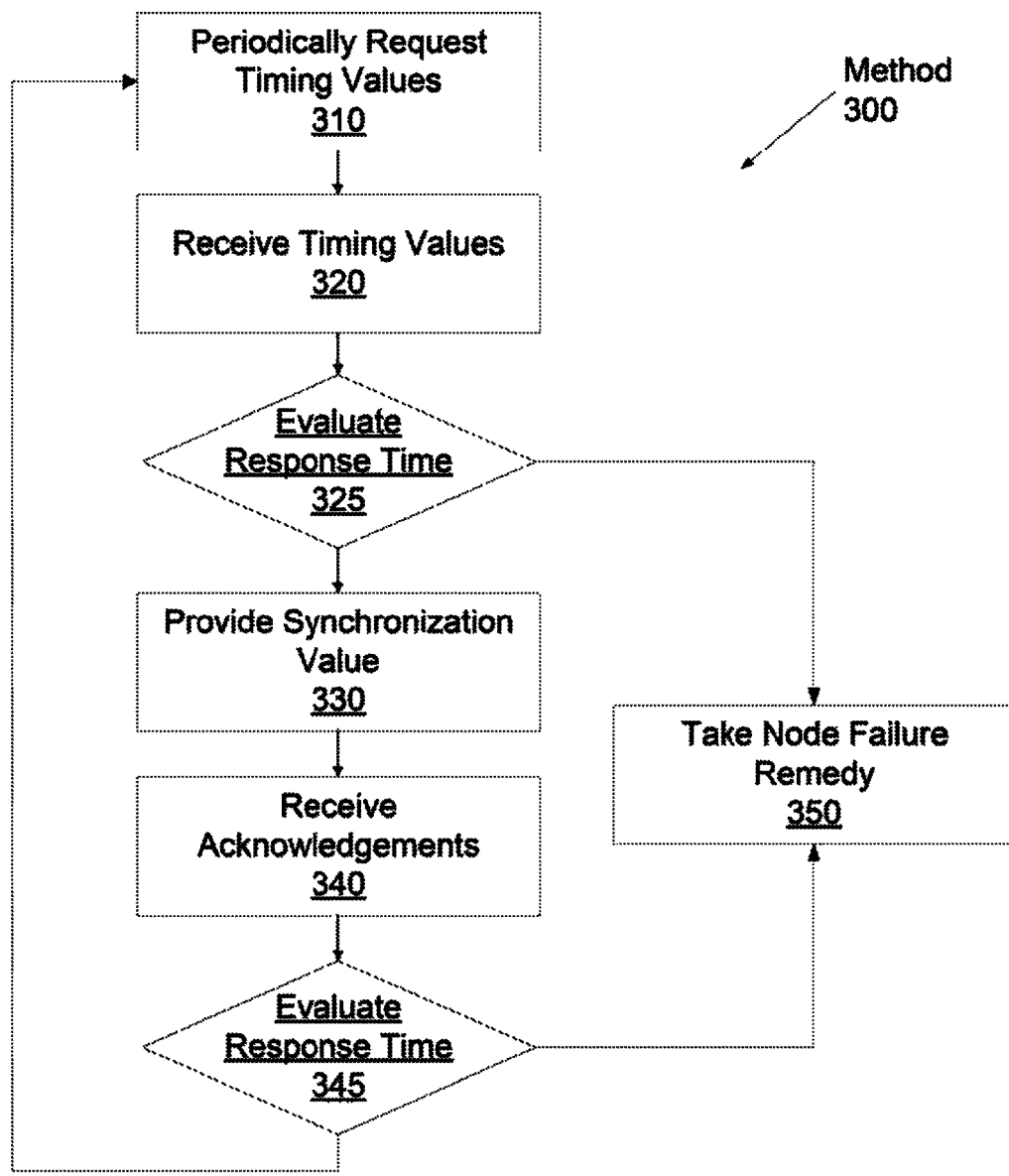
FIG. 3 illustrates another flowchart of example operations associated with node cluster synchronization.

FIG. 3 illustrates a method 300 associated with node cluster synchronization. Method 300 includes many actions similar to those described with reference to method 200 (FIG. 2 above). For example method 300 includes periodically requesting timing values at 310, receiving timing values at 320 and providing a synchronization value at 330. As mentioned above, these actions may be performed by a synchronization logic operating on a node in a computing cluster. In one example, the timing values may be requested using a multicast signal and received from the nodes via unicast replies. The synchronization value may be provided using a multicast signal. Using a multicast signal to broadcast timing values request and synchronization values may cause less network congestion than if unicast signals were used. Method 300 also includes receiving acknowledgements of receipt of the synchronization value from members of the set of nodes at 340. The acknowledgements may be received via unicast acknowledgements. In one example, the acknowledgements may take the form of networking acknowledgements. In another example, the acknowledgements may take the form of a piece of information provided by the node sending the acknowledgment. Receiving the acknowledgements may allow the synchronization logic to be sure that the nodes in the computing cluster have all entered a new epoch and that it is safe to begin repeating actions of method 300. This may also ensure that nodes are operating during either the same or consecutive epochs.

Method 300 also includes evaluating whether a node is taking too long to respond to the request for timing values at 325. In one example, the node may be considered to be taking too long to respond when a network timeout occurs to sending the request for timing values to the node. In another example, the node may be considered to be taking too long to respond when the node does not respond to the request for timing values within a predetermined amount of time. When it is determined that a node is taking too long to respond to the request for timing values, method 300 includes taking a node failure remedy at 350. Method 300 also includes, at 345, evaluating whether a node is taking too long to respond to the provision of the synchronization value. Thus, method 300 also includes taking a node failure remedy at 350 when a member of the set of nodes takes too long to acknowledge receipt of the synch value.

The node failure remedy taken at 350 may be, for example, resending a request for the timing value from the member of the set of nodes. The node failure remedy taken at 350 may also be resending the synchronization value to the member of the set of nodes. These remedies may be preferable to immediately going into a cluster recovery process because it is possible that a signal was lost due to, for example, network congestion, or another reason that would not otherwise indicate that a node in the cluster has failed.

In some instances, failure of a node to respond after a predetermined time and/or after preliminary node failure remedies are taken may mean that measures to restore operation to one or more nodes should be taken. Thus, the node failure remedy taken at 350 may include identifying an epoch during which a node failure occurred. The epoch may be identified based on the synchronization value. The node failure remedy may also include restoring members of the set of nodes to a state from prior to the epoch. The node failure remedy may also include determining an ordering of events that took place during the epoch. The node failure remedy may also include re-performing the events based on the ordering of the events. It will be appreciated that other events, not just from the epoch during which the node failure occurred, may also need to be replayed. For example, when the state to which members of the set of nodes are restored was saved during a prior epoch, events that occurred between the prior epoch and an epoch during which the node failure was detected may be replayed.

Figure 4:
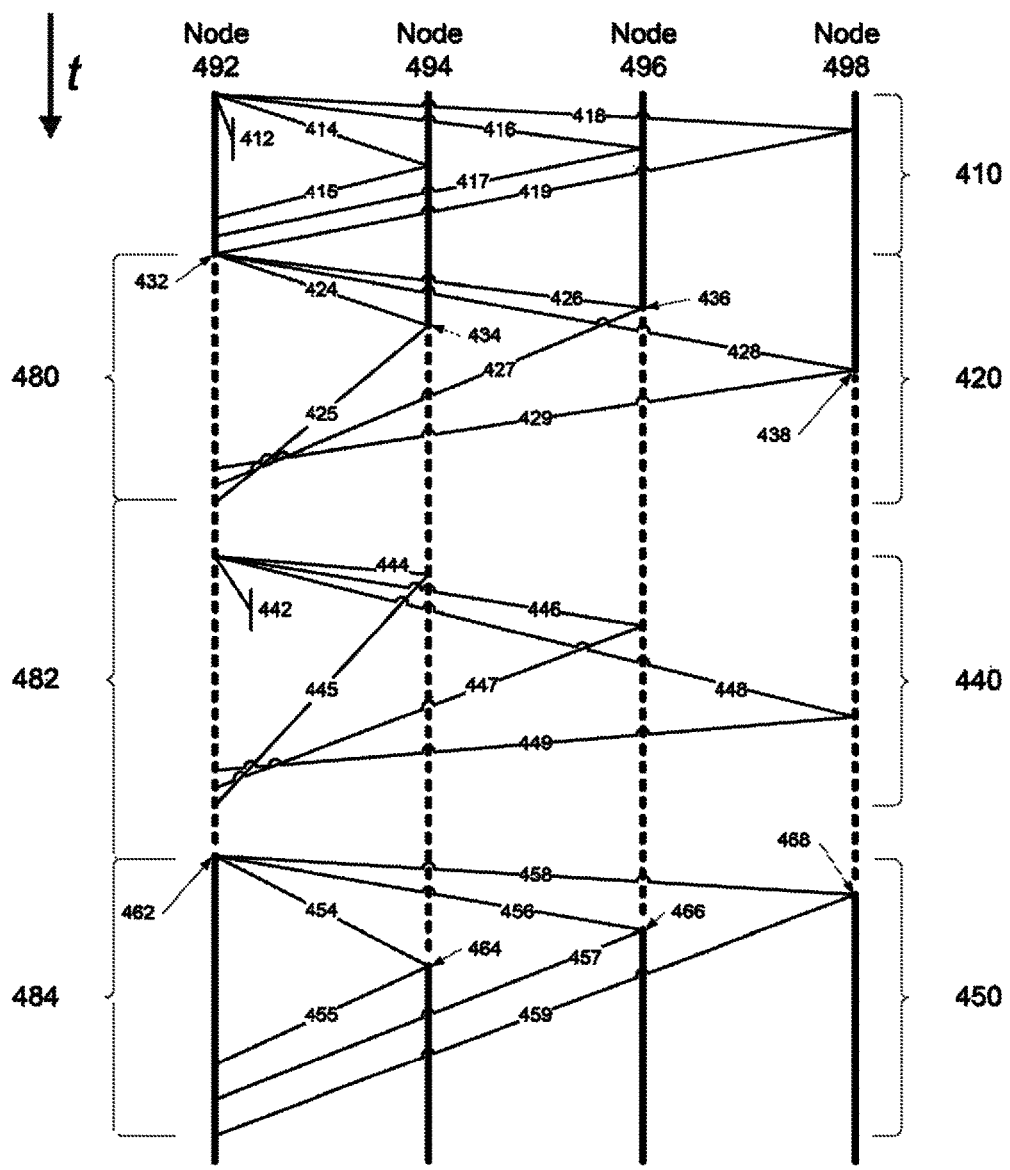
FIG. 4 illustrates an example signaling diagram that illustrates a node cluster synchronization scenario.

FIG. 4 illustrates an example signaling diagram that illustrates a node cluster synchronization scenario. FIG. 4 illustrates example signals that are passed between nodes 492, 494, 496, and 498 in a computing cluster over time. Time proceeds down the signaling diagram depicted in FIG. 4. In this example node 492 represents a node configured with a synchronization logic that requests timing values (e.g., Lamport clock values) and provides synchronization values to other nodes in the computing cluster (e.g., nodes 494, 496, 498). While a computing cluster having four nodes is illustrated in FIG. 4, clusters with differing numbers of nodes are possible.

The signals passed between nodes 492, 494, 496, and 498 fall into four periods: two read periods 410 and 440, and two write periods 420 and 450. During the first read period 410, the synchronization logic on node 492 requests timing values from each of the nodes in the computing cluster via various signals. Here, node 492 sends signals 414, 416, and 418 requesting timing varies to nodes 494, 496, and 498 respectively. These signals are received by their respective recipient nodes at venous times during the first read period 410. There may be various causes for differing timing of receipt of various signals illustrated throughout the signaling diagram including, for example, distance between nodes, network congestion, and so forth. Synchronization logic also obtains a timing value from node 492 at 412 via, for examples a memory read call to a location on node 492 at which a timing value is stored.

Upon receiving the request for tuning value from node 492, nodes 494, 496, and 498 respond by sending signals 415, 417, and 419 respectively, that contain timing values associated with their respective nodes. These signals are received by node 492 at various times and in various orders. In this example, the last signal received by node 492 is signal 419 received from node 496.

At this point the synchronization logic on node 492 begins write period 420 by sending a synchronization value via signals 424, 426, and 428 to nodes 494, 496, and 498 respectively. The receipt of the synchronization value at the nodes causes the nodes to consider themselves to have entered a new epoch. This is denoted on the signal diagram by the transition from the solid line to the dashed line. Node 492 makes this transition at time 432 upon sending signals 424, 426, and 428 to their respective recipient nodes. Nodes 494, 496, and 498 make the transition to the new epoch at times 434, 436, and 438 respectively upon receiving signals 424, 426, and 428 respectively. It should be appreciated that the different line types (e.g., dashed, solid) for the nodes in FIG. 4 are merely meant to illustrate when nodes change epochs and are not intended to indicate that certain epochs have features that other epochs do not. Further, as is shown, nodes transition between epochs at different times depending on when a signal is received. However, because node 492 ensures that all nodes are operating in the same epoch before beginning a transition to another epoch, the number of event pairings for which an ordering function is indeterminate may be limited.

Upon making epoch transitions, nodes 494, 486, and 498 send acknowledgement signals 425, 427, and 429 respectively to node 492 signifying that the nodes have entered the new epoch. Upon receiving the final acknowledgement signal from the nodes 494, 496, and 498, in this example it is signal 425 from node 494, the synchronization logic on node 492 may be certain that each of the nodes 492, 494, 496 and 498 have entered the new epoch, and that write period 420 has ended.

Eventually, the synchronization logic begins a second write period 440 by sending signals 444, 446, and 448 requesting timing values to nodes 494, 496, and 498 respectively. The synchronization logic also reads a timing value from memory on node 492 at 442. Here, second write period 440 begins after a delay, illustrated as the gap between when 492 receives signal 425 and begins write, period 440 by requesting timing values. This may occur, for example, because a specific delay has been configured to occur between write periods and read periods, or because read periods are configured to begin on set intervals and write period 420 ended before the beginning of the next interval.

As before, nodes 494, 496, and 498 respond to requests for timing values from the synchronization logic by sending timing values via signals 445, 447, and 449 respectively. Here, signal 445 is the last signal received by node 492, indicating that the synchronization logic may begin a second write period 450. However, as above, a delay is illustrated between second read period 440 and second write period 450.

When the synchronization logic initiates write period 450, it sends a synchronization value via signals 454, 456, and 458 to nodes 494, 496, and 498 respectively. The receipt of these signals may signify to the nodes that a third epoch has begun, as signified in the diagram by the transition from the dashed line back to a solid line. Thus, nodes 494, 496, and 498 enter the third epoch at times 464, 466, and 468 respectively. Node 492 enters the third epoch at time 462 when the synchronization logic provides the signals to the other nodes. After entering the third epoch, nodes 494, 498, and 498 acknowledge receiving the synchronization value via signals 455, 457, and 459 respectively.

Figure 5:
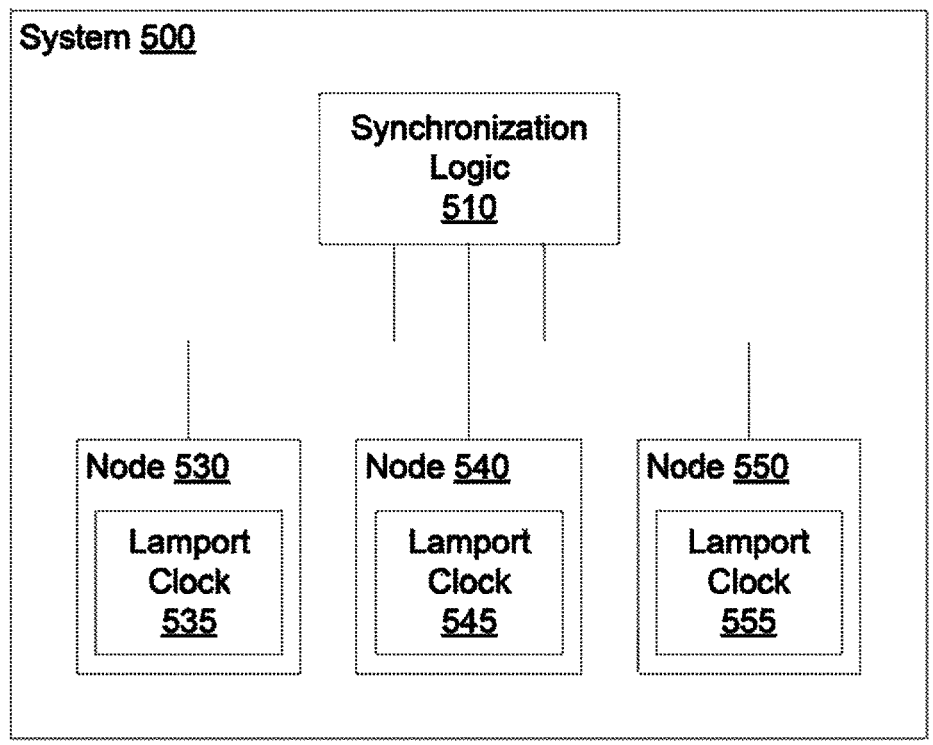
FIG. 5 illustrates an example system for facilitating node cluster synchronization.

One feature of this system is that the synchronization logic on node 492 can be sure that periods of global certainty, where all nodes are operating under the same epoch, alternate with periods of global uncertainty, where some nodes may be operating in different, though adjacent epochs. FIG. 4 illustrates two periods of global uncertainty 480 and 484, and one period of global certainty 482. Periods of global uncertainty may begin when node 492 transitions to a new epoch (e.g., at time 432) and provides synchronization values to the other nodes. These periods are considered periods of global uncertainty because the synchronization logic does not know exactly when the remote nodes transition to the new epoch. Periods of global uncertainty may end when node 492 has received an acknowledgement from each of the other nodes (e.g., signal 425 is the last acknowledgement received during first write period 420). This same time marks the beginning of a period of global certainty 482 which ends the next time node 492 begins another write period (e.g., at time 462), at which point another global uncertainty period 484 begins. Knowing that an event took place during a period of global certainty may increase the number of event pairs that a fast ordering function can evaluate FIG. 5 illustrates a cluster system 500 associated with node cluster synchronization. System 500 includes a set of computing nodes. While three computing nodes 530, 540, and 550 are shown, a greater or lesser number of nodes are possible. Each of the computing nodes includes a Lamport clock. Here, Lamport clock 535 is associated with computing node 530, Lamport clock 545 is associated with computing node 540, and Lamport clock 555 is associated with Lamport clock 550. As described above Lamport clocks are incremented as events occur on nodes and are used when ordering events on the nodes during, for example, a node recovery.

System 500 also includes a synchronization logic 510. Synchronization logic 510 may request Lamport lock values from the Lamport clock of each computing node. Synchronization logic 510 may also provide a synchronization values to the nodes in the set of nodes based on the Lamport clock values. Computing nodes 530, 540, and 550 may acknowledge receipt of the synchronization values. Synchronization logic 510 may periodically alternate between requesting Lamport clock values and providing synchronization values. This alternation may create epoch divisions that the nodes can be used to create a partial ordering of events occurring on the nodes. Further, by introducing a delay between requesting actions and providing actions, synchronization logic 510 may be able to increase the sizes of epochs. The delay may be chosen based off of a tradeoff between network overhead, and node failure recovery time. Thus, while reducing the delay may speed up recovery time because there will be fewer potential events that require tiebreaking and/or applying a complex ordering function, increasing the delay may reduce network overhead.

Figure 6:
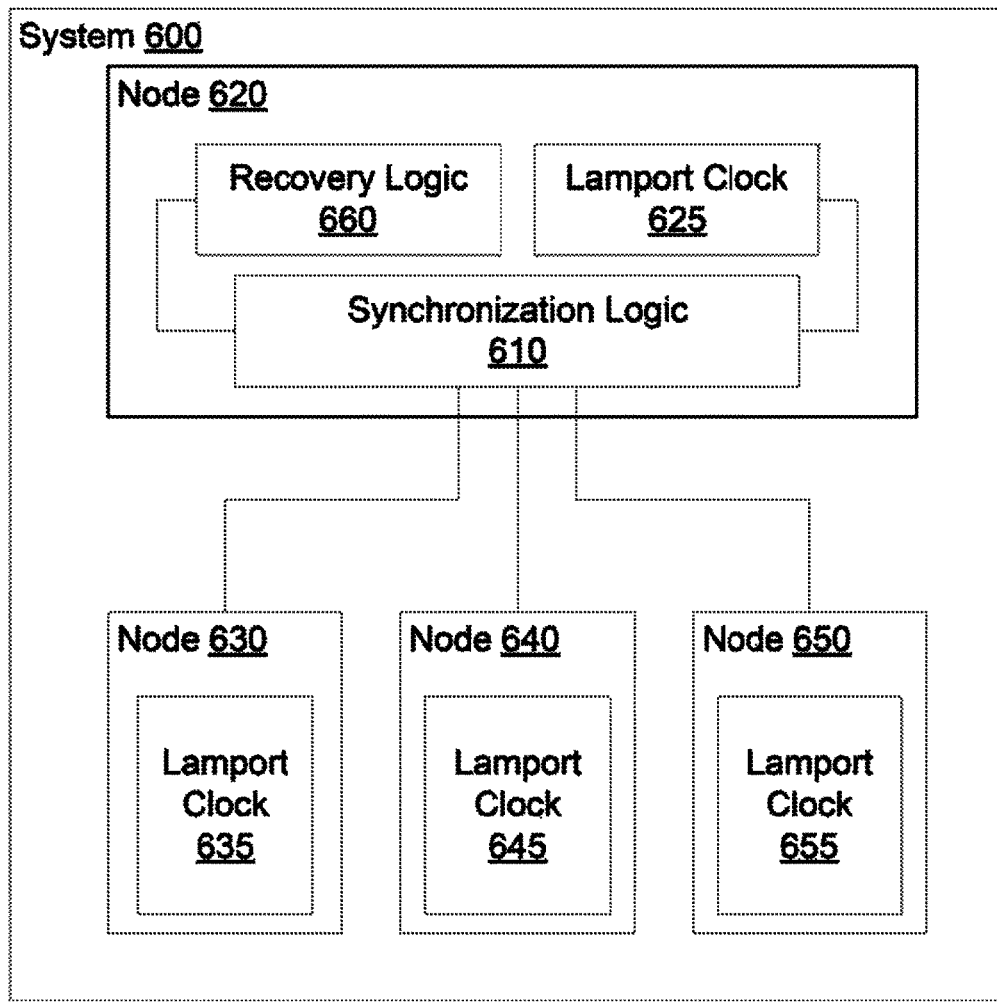
FIG. 6 illustrates another example system for facilitating node cluster synchronization.

FIG. 6 illustrates a cluster system 600 associated with node cluster synchronization. System 600 includes several items similar to those in system 500 (FIG. 5). For example, system 600 includes computing nodes 630, 640, and 650 which contain Lamport clocks 635, 645, and 655 respectively. System 600 also includes a synchronization logic 610. Here, synchronization logic 610 is a process run by a computing node 620 in a set of computing nodes that also includes nodes 630, 640, and 650. Thus, computing node 620 may also have a Lamport clock 625. Here, the synchronization logic 610 may be able to simply read from memory a Lamport clock value associated with Lamport clock 625 instead of sending a query to a process that relies on Lamport clock 625 for event ordering.

System 600 also includes a recovery logic 660. The recovery logic may take a remedial action when the synchronization logic fails to obtain a Lamport clock value from a node after a period of time. A remedial action may also be taken when an acknowledgement is not received in response to a synchronization value. As detailed above, the remedial action may involve resending a request for a Lamport clock value, resending a synchronization value, or triggering a recovery of the node cluster.

Figure 7:
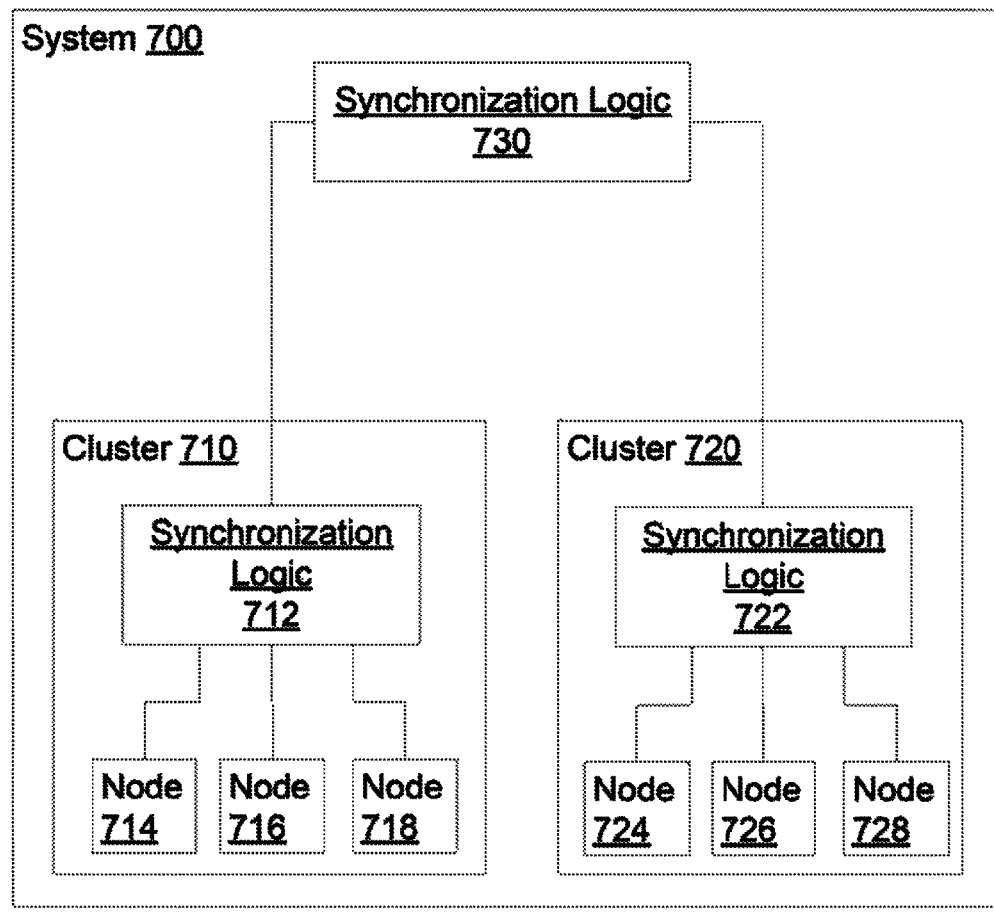
FIG. 7 illustrates another example system for facilitating node cluster synchronization.

FIG. 7 illustrates an example system 700 associated with node cluster synchronization. System 700 includes clusters 710 and 720. These clusters may be similar to system 500 (FIG. 5). Though two clusters are shown, a different number of clusters is possible. Thus, cluster 710 includes a synchronization logic 712 which communicates with computing nodes 714, 716, and 718. Similarly cluster 720 includes a synchronization logic 722 which communicates with computing nodes 724, 726, and 728. The computing nodes may include Lamport Clocks (not shown) that are used to order events taken on the computing nodes. As in system 600

(FIG. 6), the synchronization logics 712 and 722 may be operating on other computing nodes in their respective clusters.

System 700 also includes an upstream synchronization logic 730. Upstream synchronization logic 730 may be operating on its own computing node that performs other functionality for system 700 (e.g., administrative functionality, service provision functionality). Synchronization logics 712 and 722 may request Lamport clock values from computing nodes in their respective clusters in response to a signal received from upstream synchronization logic 730. Synchronization logics 712 and 722 may also provide data to the upstream synchronization logic 730 based on Lamport clock values they receive from the computing nodes in their respective clusters. Synchronization logics 712 and 722 may also provide synchronization values to computing nodes in their respective clusters based on data received from upstream synchronization logic 730. The data received by synchronization logics 712 and 722 from upstream synchronization logic 730 may be generated based on the data provided to upstream synchronization logic 730 by synchronization logics 712 and 722.

Figure 8:
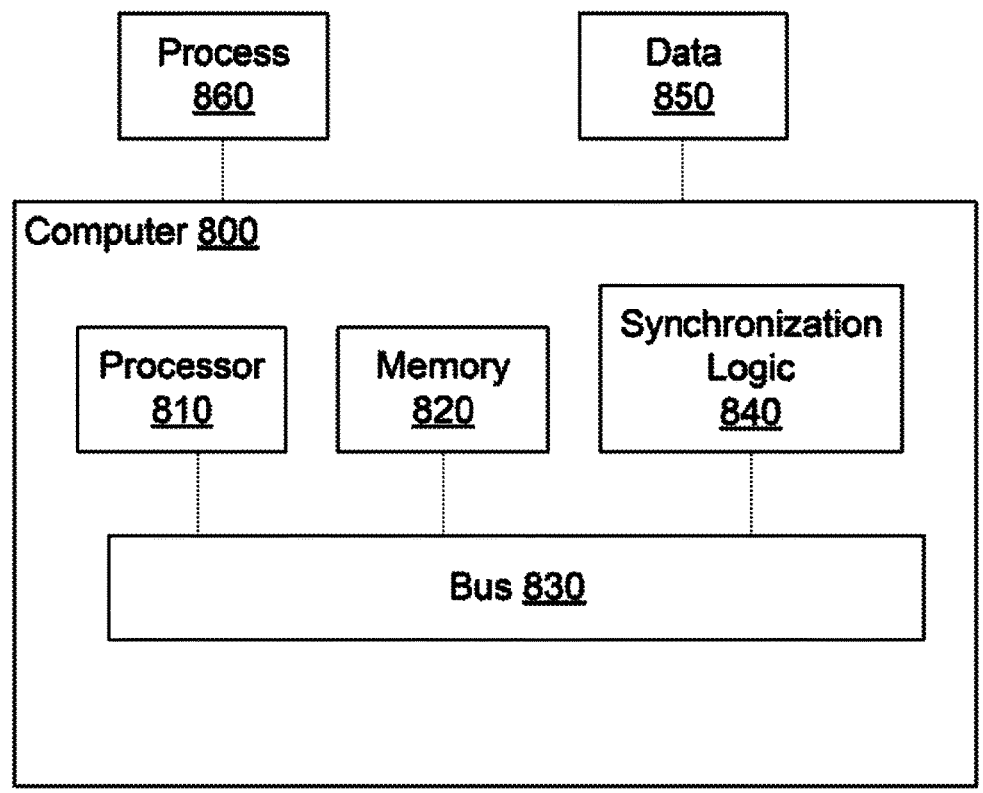
FIG. 8 illustrates an example computing environment which example systems and methods, and equivalents, may operate.

FIG. 8 illustrates an example computing environment in which example systems and methods, and equivalents, may operate. The example computing device may be a computer 800 that includes a processor 810 and a memory 820 connected by a bus 830. The computer 800 includes a node cluster synchronization logic 840. In different examples, node cluster synchronization logic may be implemented as a non-transitory computer-readable medium storing computer-executable instructions its hardware, software, firmware, an application specific integrated circuit, and/or combinations thereof.

The instructions, when executed by a computer, may cause the computer to periodically provide a global sequence number (e.g., a synchronization value) to a set of nodes. The global sequence number may be generated as a function of Lamport clock values obtained from members of the set of distributed systems. In one example, global sequence numbers may identify sequential epochs during which events occur on members of the set of nodes (e.g., database reads, database writes). The epochs may be structured in such a way that a first action is guaranteed to have preceded a second event when an epoch associated with the second event exceeds an epoch associated with the first event by more than one epoch.

The instructions may also be presented to computer 800 as data 850 that are temporarily stored in memory 820 and then executed by processor 810. The processor 810 may be a variety of various processors including dual microprocessor and other multi-processor architectures. Memory 820 may include volatile memory (e.g., read only memory) and/or non-volatile memory (e.g., random access memory). Memory 820 may also be, for example, a magnetic disk drive, a solid state disk drive, a floppy disk drive, a tape drive, a flash memory card, an optical disk, and so on. Thus, Memory 820 may store process 860 and/or data 850. Computer 800 may also be associated with other devices including other computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computer-implemented method, comprising:
   periodically requesting timing values from a set of nodes in a computing cluster that are implementing a distributed service by locally performing events;
   receiving timing values from members of the set of nodes; and
   providing a synchronization value to members of the set of nodes identifying a global sequence number of an epoch to which each node then transitions at time of receipt of the synchronization value, each node transitioning to the epoch within a global uncertainty period between a time of providing the synchronization value and a time of last acknowledgement of receipt of the synchronization value from the nodes, in which exactly when each node has transitioned to the epoch is unknown,
   the synchronization value generated based on the timing values;
   performing a node failure remedy responsive to a node failure, comprising:
      determining an order of the events that occurred prior to an epoch in which the node failure occurred, including determining with guaranteed certainty that a first event occurred at a first node before a second event occurred at a second node when the global sequence number of the epoch in which the first event occurred is less than one plus the global sequence number of the epoch in which the second event occurred; and
      re-performing the ordered events to recover from the node failure.

2. The computer-implemented method of claim 1, where the timing values are Lamport clock values.

3. The computer-implemented method of claim 1, comprising:
   receiving the acknowledgements of receipt of the synchronization value from members of the set of nodes.

4. The computer-implemented method of claim 3,
   where the timing values are requested using a multicast signal and received via unicast replies,
   the synchronization value is provided using a multicast signal, and
   the acknowledgements are received via unicast acknowledgments.

5. The computer-implemented method of claim 3, where the node failure remedy is taken when a timing value is not received from a member of the set of nodes within a certain period of time after requesting the timing values, or when an acknowledgement is not received from a member of the set of nodes within a certain period of time after providing the synchronization value.

6. The computer-implemented method of claim 5, where the node failure remedy further comprises one of, resending the request for the timing value from the member of the set of nodes and resending the synchronization value to the member of the set of nodes.

7. The computer-implemented method of claim 5, where the node failure remedy comprises:
   identifying the epoch during which the node failure occurred based on the synchronization value, wherein re-performing the ordered events restores members of the set of nodes to a state from prior to the epoch.

8. A cluster system, comprising:

a set of computing nodes, each computing node having a Lamport clock, the nodes to each locally perform events to realize a service distributed over the nodes; and a synchronization logic to request Lamport clock values from the Lamport clock of each computing node and to provide a synchronization value to the nodes in the set of nodes based on the Lamport clock values, the synchronization value identifying a global sequence number of an epoch to which each node then transitions at time of receipt of the synchronization value, each node transitioning to the epoch within a global uncertainty period between a time of providing the synchronization value and a time of last acknowledgement of receipt of the synchronization value from the nodes, in which exactly when each node has transitioned to the epoch is unknown; and a recover logic to perform a remedial action responsive to a node failure, by determining an order of the events that occurred prior to the epoch in which the node failure occurred, including determining with guaranteed certainty that a first event occurred at a first node before a second event occurred at a second node when the global sequence number of the epoch in which the first event occurred is less than one plus the global sequence number of the epoch in which the second event occurred, wherein the nodes re-perform the ordered events to recover from the node failure.

9. The system of claim 8, where the recovery logic is to perform the remedial action when the synchronization logic fails to obtain a Lamport clock value from a node after a period of time.

10. The system of claim 8, where they synchronization logic periodically alternates between requesting the Lamport clock values and providing the synchronization value to create epoch divisions that the nodes use to create a partial ordering of events occurring on the nodes.

11. The system of claim 10, where the synchronization logic introduces a delay between requesting actions and providing actions to increase sizes of epochs.

12. The system of claim 8, where the synchronization logic requests the Lamport clock values in response to a signal received from an upstream synchronization logic, provides data to the upstream synchronization logic based on the Lamport clock values, and provides the synchronization value to the nodes based on data received from the upstream synchronization logic, where the data is generated based on the Lamport clock values.

13. A non-transitory computer-readable medium storing computer-executable instructions that when executed by a computer cause the computer to:

periodically provide a global sequence number to a set of nodes that are implementing a distributed service by locally performing events, the global sequence number identifying a global sequence number of an epoch to which each node then transitions at time of receipt of the synchronization value, each node transitioning to the epoch within a global uncertainty period between a time of providing the synchronization value and a time of last acknowledgment of receipt of the synchronization value from the nodes, in which exactly when each node has transitioned to the epoch is unknown, the global sequence number generated as a function of Lamport clock values obtained from members of the set of nodes;

perform a node failure remedy responsive to a node failure, by:

determining an order of the events that occurred prior to the epoch in which the node failure occurred, including determining with guaranteed certainty that a first event occurred at a first node before a second event occurred at a second node when the global sequence number of the epoch in which the first event occurred is less than one plus the global sequence number of the epoch in which the second event occurred; and cause the nodes to re-perform the ordered events to recover from the node failure.

14. The non-transitory computer-readable medium of claim 13, where global sequence numbers identify sequential epochs during which events occur on members of the set of nodes.

* * * * *